United States Patent [19]
Yasui et al.

[11] Patent Number: 5,154,224
[45] Date of Patent: Oct. 13, 1992

[54] REFRACTORY BRICK FOR A GLASS FUSION FURNACE

[75] Inventors: Kouhei Yasui, Aichi; Takeshi Nakamura, Ohbu; Tsutomu Iwaguchi; Hideki Igarashi, both of Kariya, all of Japan

[73] Assignee: Toshiba Ceramics Co., Ltd., Japan

[21] Appl. No.: 603,142

[22] Filed: Oct. 25, 1990

[51] Int. Cl.$^5$ .............................................. F28D 17/02
[52] U.S. Cl. ...................................... 165/9.1; 165/9.3
[58] Field of Search ........................... 165/9.1, 9.2, 9.3

[56] References Cited

U.S. PATENT DOCUMENTS

| | | | |
|---|---|---|---|
| 1,792,663 | 2/1931 | Strack | 165/9.1 |
| 2,389,166 | 11/1945 | Seaver . | |
| 2,833,532 | 5/1958 | Ries . | |
| 4,540,039 | 9/1985 | Karl | 165/9.1 |
| 4,651,810 | 3/1987 | Triessnig | 165/9.1 |
| 4,874,034 | 10/1989 | Hirata et al. . | |

FOREIGN PATENT DOCUMENTS

| | | |
|---|---|---|
| 0093472 | 4/1983 | European Pat. Off. . |
| 6050 | 12/1882 | United Kingdom ........... 165/9.1 |
| 434127 | 8/1935 | United Kingdom . |
| 667448 | 2/1952 | United Kingdom . |
| 994833 | 3/1962 | United Kingdom . |
| 2122328 | 11/1982 | United Kingdom . |

Primary Examiner—Albert W. Davis, Jr.
Attorney, Agent, or Firm—Lorusso & Loud

[57] ABSTRACT

A refractory brick for a glass fusion furnace includes a triangular hollow-prism type brick body (1) having a flow passage (1c) formed so as to extend between two opposite ends of the brick. The flow passage (1c) has a substantially triangular cross-section.

4 Claims, 12 Drawing Sheets

REFRACTORY BRICK FOR A GLASS FUSION FURNACE

BACKGROUND OF THE INVENTION

This invention relates to a refractory brick for a heat regenerator in a glass fusion furnace.

In a conventional glass fusion furnace, refractory bricks are stacked in a heat regenerator in such a manner that hot exhaust gases coming through a blow-off hole are introduced into the heat regenerator so as to heat the bricks. Cold air to be used in the burning of fuel is preheated by the heated bricks.

Preferably, each brick has a large specific surface, and air flow is turbulent.

The conventional bricks for glass fusion furnaces include hollow-prism type bricks as disclosed in Japanese Patent Laid-Open Nos. 55-149139 and 63-213794 and cross type bricks as disclosed in Japanese Utility Model Laid-Open No. 53-56452. The conventional prism type bricks have a flow passage with a square cross-section.

In such conventional bricks, stability of stacked bricks, arrangement workability and heat efficiency are not satisfactory in total.

SUMMARY OF THE INVENTION

The object of this invention is to provide a refractory brick for a regenerator in a glass fusion furnace, having excellent stack stability, improved arrangement workability and high heat efficiency.

A refractory brick according to this invention has a flow passage having a substantially triangular cross-section.

In a heat regenerator, a plurality of refractory bricks are stacked at plural stages in both horizontal and vertical directions. Each of the bricks has a triangular hollow-prism type brick body, an inner flow passage extending between two opposite ends of the brick body, a projection formed on one of the opposite ends and a recess formed in the other end. Each three adjacent bricks define an outer flow passage among them. Thus, a plurality of vertical inner and outer flow passages are formed in the regenerator.

It is preferable that a cross section of the flow passage $1c$ is substantially a regular triangle.

A lateral or horizontal passage is preferably formed in the brick body. A notch or cutout may be formed in an end of the brick body.

Large projections may be formed on an end of the brick body so as to form a space therebetween.

BRIEF DESCRIPTION OF THE DRAWINGS

FIGS. 1A to 7A are plan views showing bricks according to a first to seventh embodiments of this invention, respectively;

FIGS. 1B to 7B are front views of the bricks shown in FIGS. 1A to 9A, respectively;

EMBODIMENTS

Figure 1A:
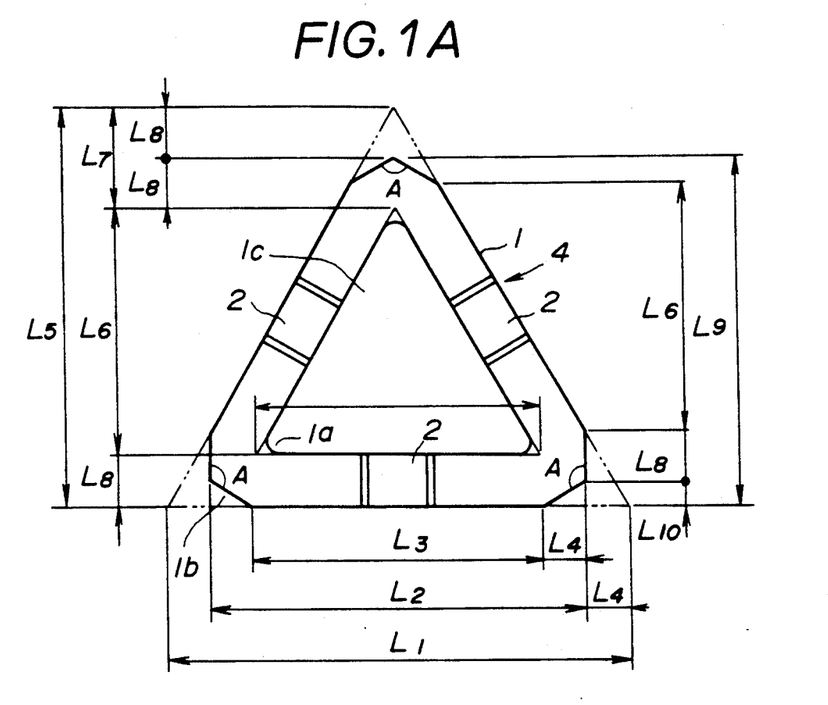
Figure 1B:
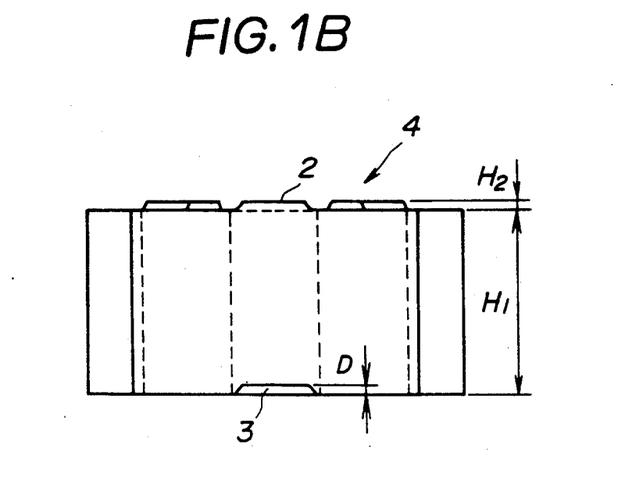

Referring to FIGS. 1A and 1B, a brick body 1 is made of magnesia in the shape of a triangular hollow-prism and has a thickness $L_8$ of 40 mm over its full length. The brick body 1 has three inner round corners $1a$ and three outer angular corners $1b$. The angle A of each outer corner $1b$ is 120 degrees. An inner flow passage $1c$ is formed between two opposite ends of the brick body 1 and has a substantially regular triangle in cross-section.

In FIG. 1A, $L_1$ is 366.4 mm, $L_2$ is 297.2 mm, $L_3$ is 228 mm, $L_4$ is 34.6 mm, $L_5$ is 317.5 mm, $L_6$ is 197.5 mm, $L_7$ is 80 mm, $L_8$ is 40 mm, $L_9$ is 277.5 mm, and $L_{10}$ is 20 mm.

In FIG. 1B, the height $H_1$ of the brick body 1 is 150 mm. Formed on an upper end of the brick body 1 is a trapezoidal projection 2 having a height $H_2$ of 6 mm. Formed on a lower end of the brick body 1 is a trapezoidal recess 3 corresponding in shape to the projection 2 for avoiding displacement or slipping of the brick body. The recess 3 has a depth D of 7 mm.

Figure 10:
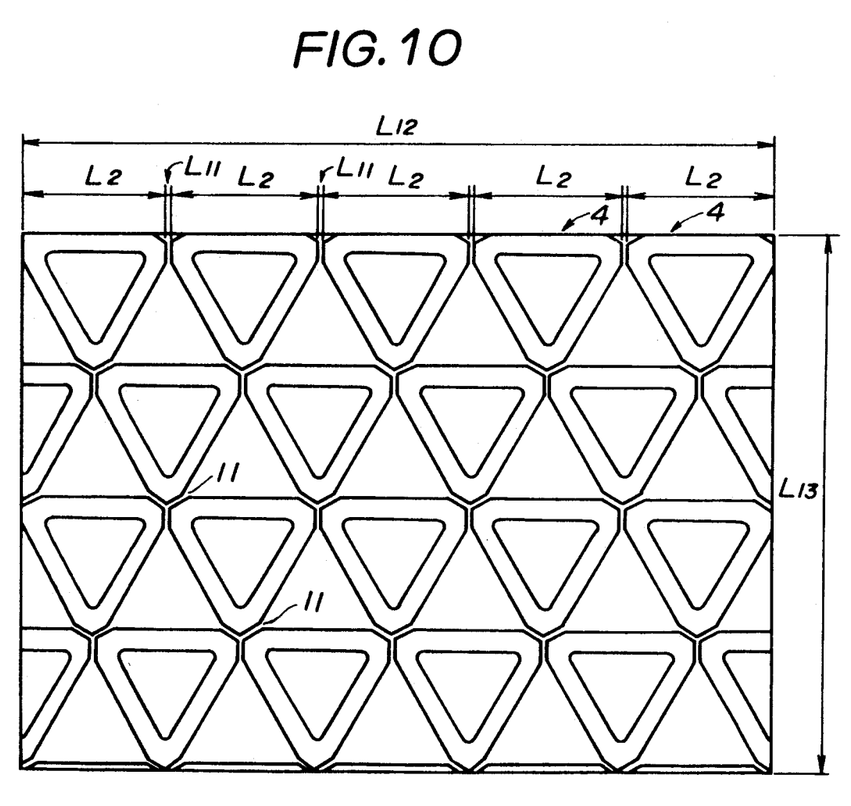
FIG. 10 is a plan view showing a brick arrangement in a single-stage form.

As shown in FIG. 10, a plurality of bricks 4 each having the brick body 1 are arranged at a first stage in a heat regenerator for a glass fusion furnace (not shown). Each outer flow passage $1d$ is formed by three adjacent bricks 4. A gap or opening 11 having $L_{11}$ of 8 mm is set among three adjacent bricks 1 in the shape of Y so as to function as an expansion joint of the bricks in heat exchange. In FIG. 10, $L_{12}$ is 1518 mm, and $L_{13}$ is 1070.7 mm.

Figure 11:
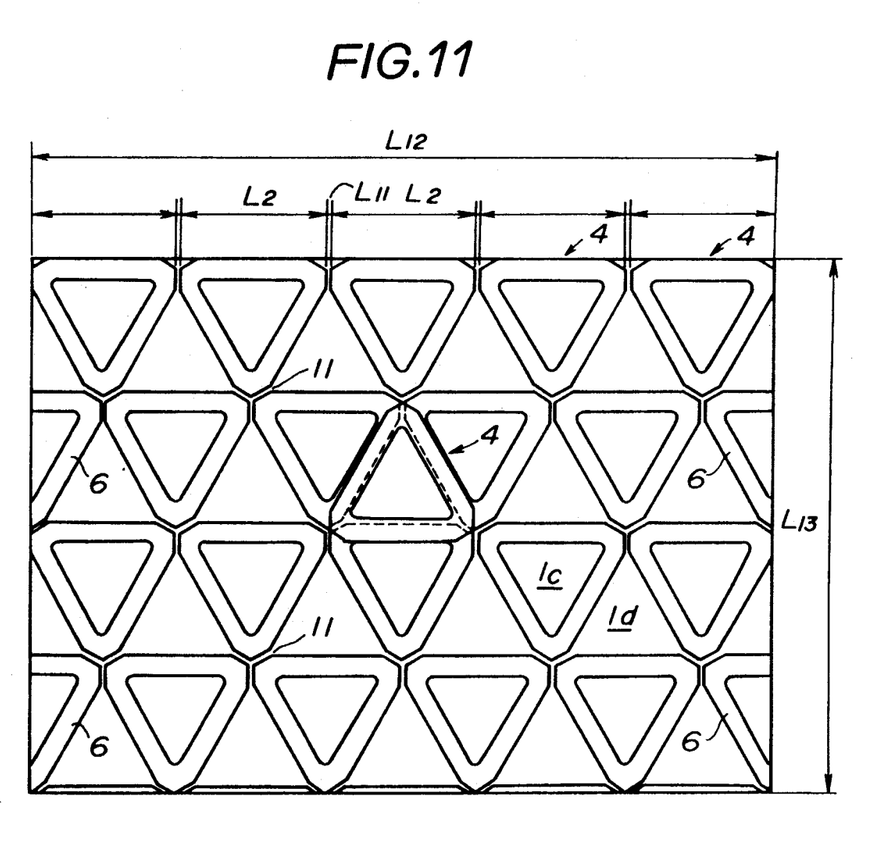
FIG. 11 is a plan view showing a brick arrangement in a two-stage form.

In addition, plural bricks 4 are arranged on the first-stage arrangement at a second stage as shown in FIG. 11 so as to form plural inner flow passages $1c$ and plural outer flow passages $1d$. Also, gaps or openings 11 are formed among the bricks 4 like at the first stage. The inner flow passages $1c$ of the first-stage arrangement join the outer flow passages $1d$ of the second-stage arrangement while the outer flow passages $1d$ of the first-stage arrangement join the inner flow passages $1c$ of the second arrangement. Thus, continuous vertical inner and outer flow passages $1c$, $1d$ are formed. In such a condition, the projections 2 of the first-stage arrangement are fit in the recesses 3 of the second-stage arrangement, respectively, so as to increase the stack stability.

As best shown in FIG. 11, the inner flow passages $1c$ slightly differ from the outer flow passages $1d$ so that turbulent flows can be easily obtained. If desired in some circumstances, both of the inner and outer flow passages $1c$, $1d$ can be substantially the same, for example, by adjusting a distance between the corners thereof.

When the bricks 4 of FIG. 1A are arranged within a specific rectangular area having $L_{12}$ (1518 mm) and $L_{13}$ (1070.7 mm) as shown in FIG. 10, the total volume of all bricks 4 is 96,961 cm$^3$, and the total surface area thereof is 41,040 cm$^2$. Thus, a specific surface of the brick arrangement in FIG. 10 is:

$41,040/96,961 = 0.42$ (cm$^2$/cm$^3$)

The total area in cross-section of all flow passages $1c$, $1d$ is 225.15 cm$^2$.

The number of bricks 4 arranged in the above-stated rectangular area is 20.5 which is small enough to improve the arrangement workability.

Figure 12A:
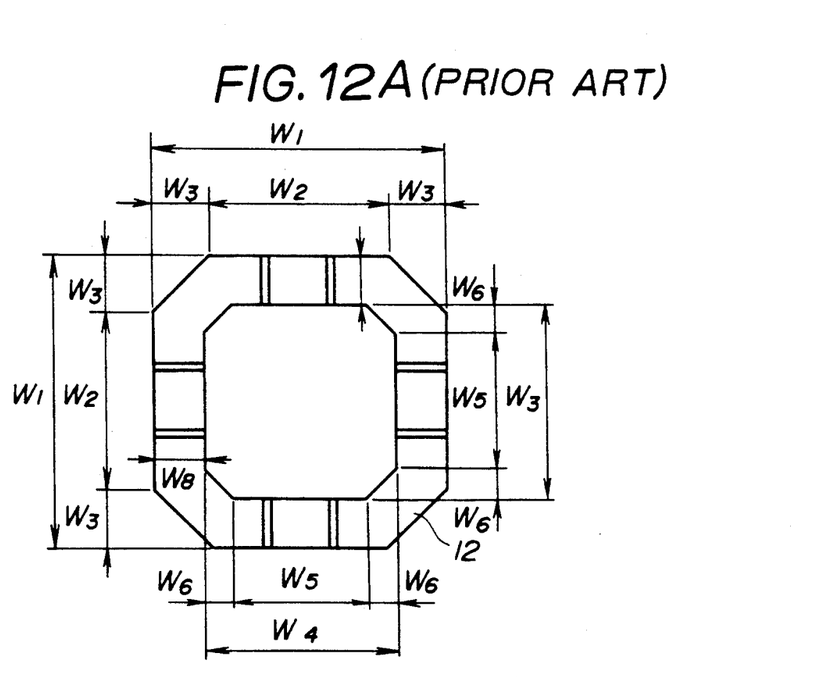
FIG. 12A is a plan view showing a conventional brick.
Figure 12B:
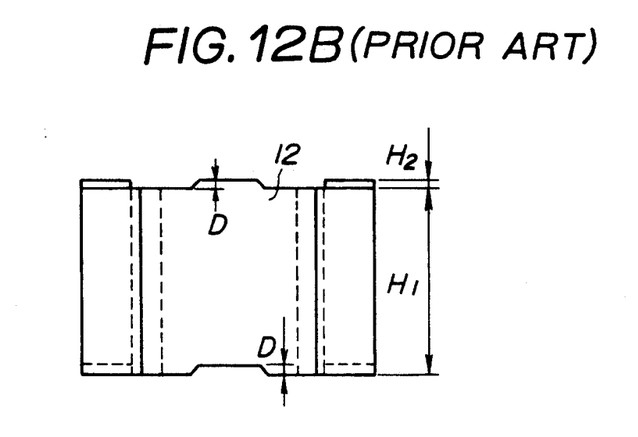
FIG. 12B is a front view of the brick shown in FIG. 12.
Figure 13:
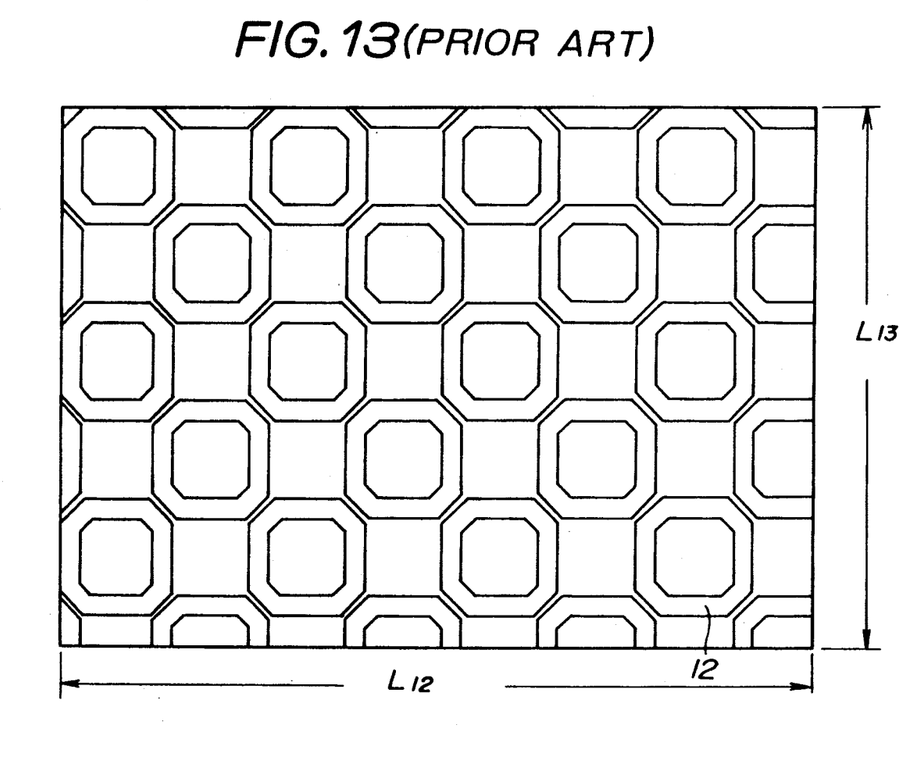
FIG. 13 is a plan view showing an arrangement of single-stage bricks shown in FIG. 12A.

FIGS. 12A and 12B show a conventional brick 12. Such conventional bricks 12 are arranged in the above-stated rectangular area as shown in FIG. 13. In FIGS. 12A and 12B, $W_1$ is 233.3 mm, $W_2$ is 141.9 mm, $W_3$ is 45.7 mm, $W_4$ is 153.3 mm, $W_5$ is 108.9 mm, and $W_6$ is 22.2 mm. The total volume of all bricks 12 in FIG. 13 is 93,039 cm$^3$, and the total surface area thereof is 31,142 cm$^2$. Thus, a specific surface of the brick arrangement in FIG. 13 is:

$$31,142/93,039 = 0.33 \text{ (cm}^2/\text{cm}^3\text{)}$$

The total area in cross-section of all flow passages is 225.15 cm$^2$ which is the same as that of FIG. 10.

The number of bricks 12 arranged in the above-stated rectangular area is 22.4.

Figure 2A:
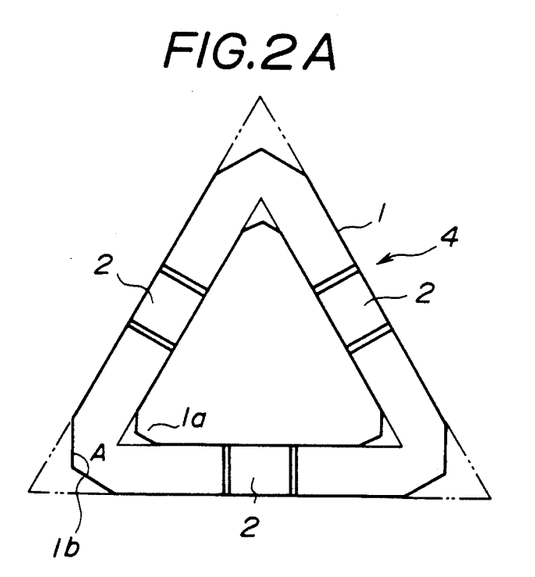
Figure 2B:
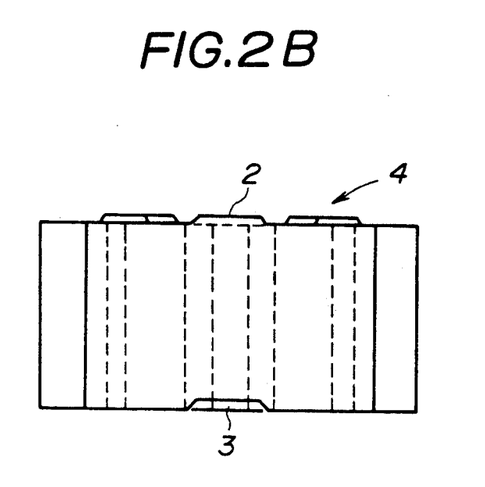

FIGS. 2A and 2B show a second embodiment of this invention. Three angular inner corners 1a have an angle more than 60 degrees. Except the angular inner corners 1a, the embodiment of FIGS. 2A and 2B is the same as that of FIGS. 1A and 1B.

Figure 3A:
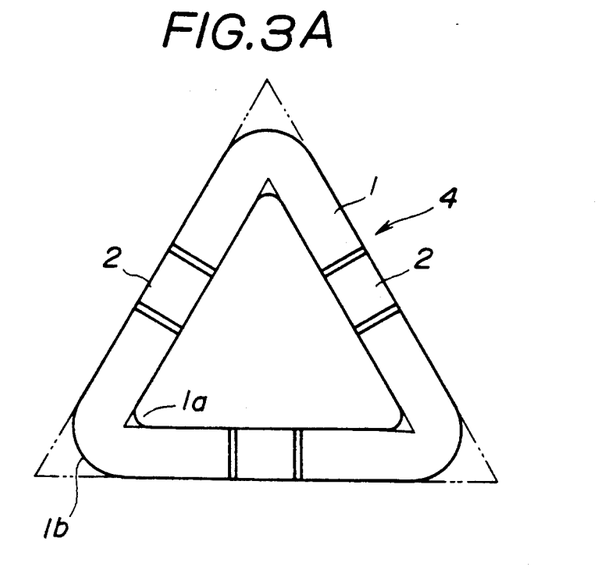
Figure 3B:
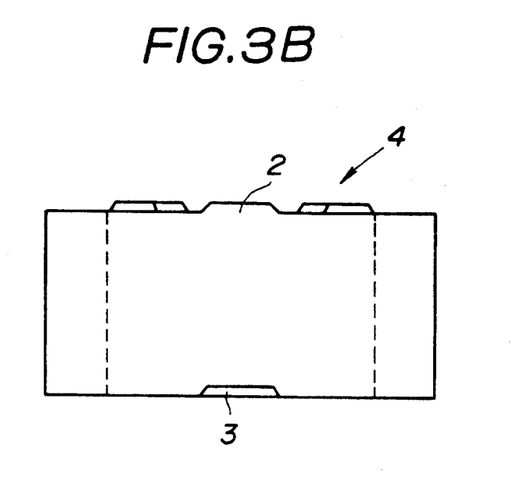

FIGS. 3A and 3B show a third embodiment of this invention which is the same as that of FIGS. 1A and 1B except three round outer corners 1b.

Figure 4A:
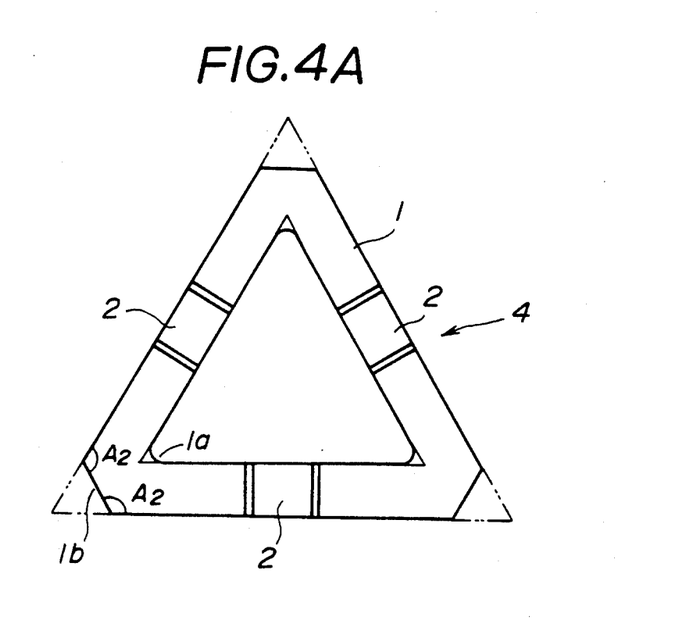
Figure 4B:
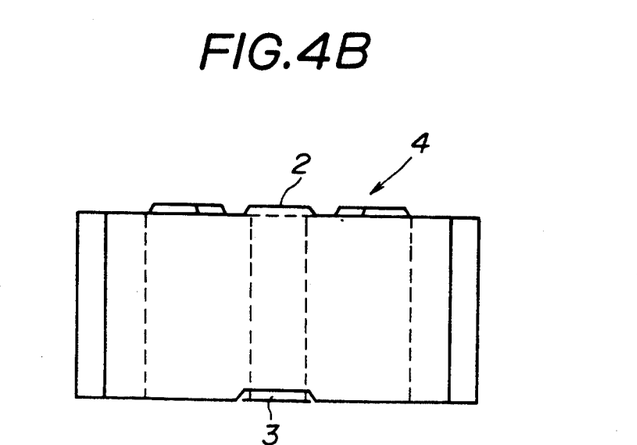

FIGS. 4A and 4B show a fourth embodiment of this invention which is the same as that of FIGS. 1A and 1B except three outer corners 1b having two angular portions $A_2$ with an angle less than 60 degrees.

Figure 5:
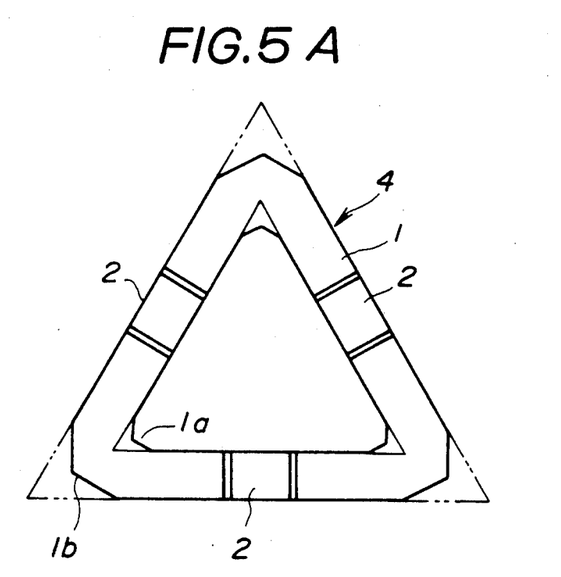

FIGS. 5A and 5B show a fifth embodiment of this invention which is the same as that of FIGS. 2A and 2B except three lateral flow passages 7 which are formed in three side walls of the brick body 1, respectively. When the bricks 4 are stacked, the lateral flow passages 7 extend between the inner flow passages 1c and the outer flow passages 1d. The number, size, shape and position of the lateral flow passages may be altered.

In the fifth embodiment of FIGS. 5A and 5B, a surface area of the bricks 4 increases and turbulent flows are remarkably formed due to the lateral passages 7.

Figure 6A:
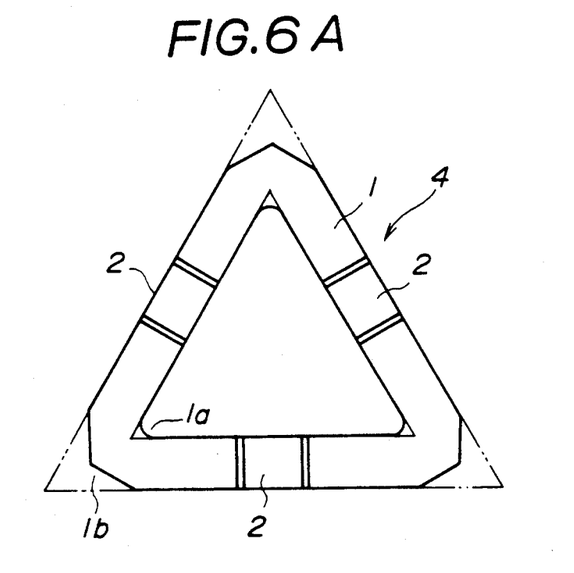
Figure 6B:
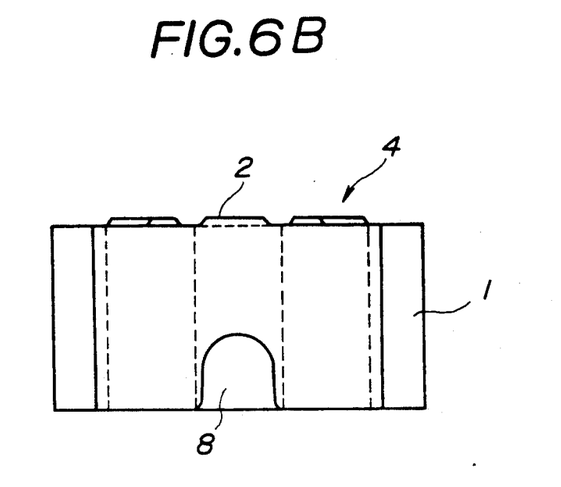

FIGS. 6A and 6B show a sixth embodiment of this invention which is the same as that of FIGS. 1A and 1B except three cutout portions or notches 8. The function of the notches 8 is similar to that of the lateral passages 7 in FIG. 5B.

Figure 7A:
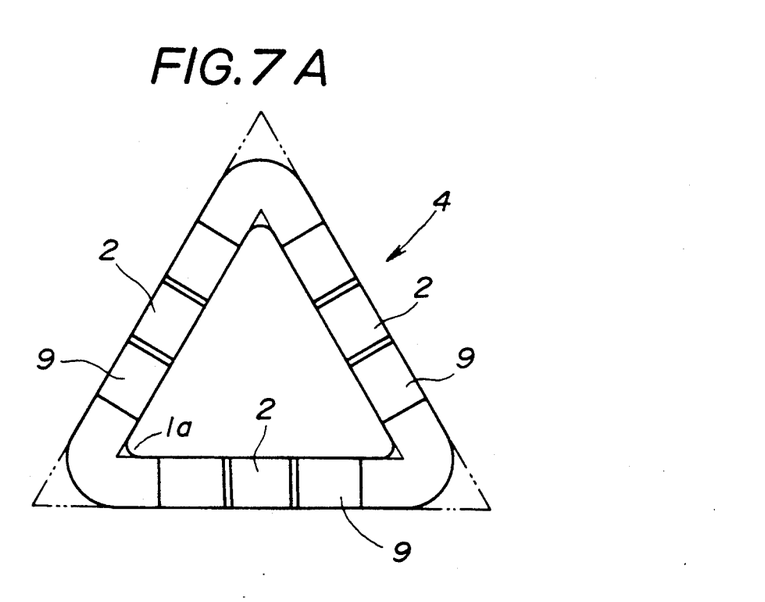
Figure 7B:
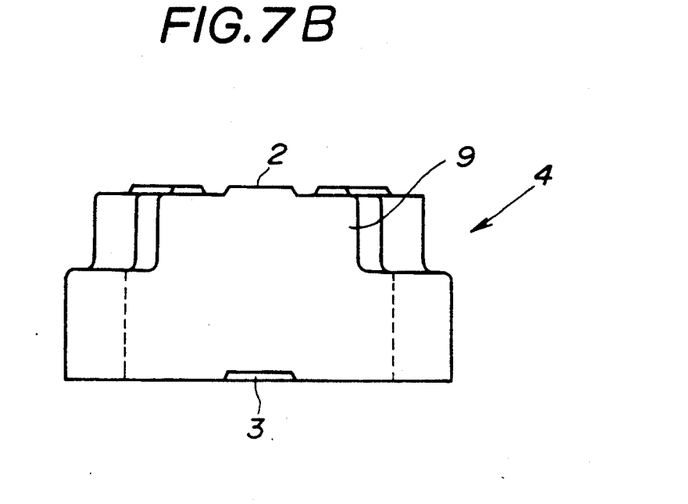

FIGS. 7A and 7B show a seventh embodiment of this invention which is the same as that of FIGS. 3A and 3B except three large projections 9 for increasing a surface area of the brick 4 and producing turbulent flows. The projections 9 ar formed in the shape of rectangular parallelopiped. A small trapezoidal projection 2 is formed on each large projection 9. Spaces are formed between the large projections 9 so as to permit the gas flow horizontally or laterally.

Figure 8:
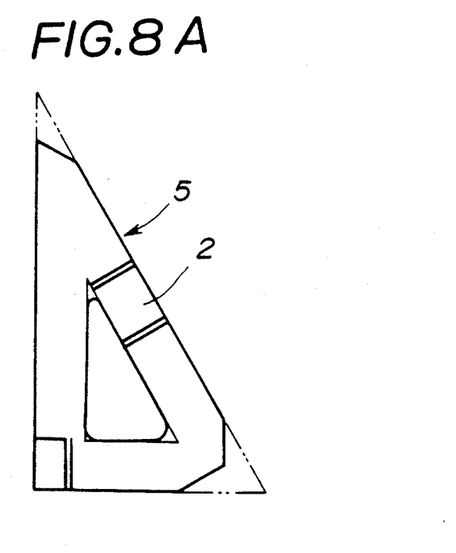
FIGS. 8A and 9A are plan views showing auxiliary bricks.
FIGS. 8B and 9B are front views of the bricks shown in FIGS. 8A and 9A, respectively.

FIGS. 8A and 8B show an auxiliary brick 5 which is placed at a corner in a regenerator.

Figure 9:
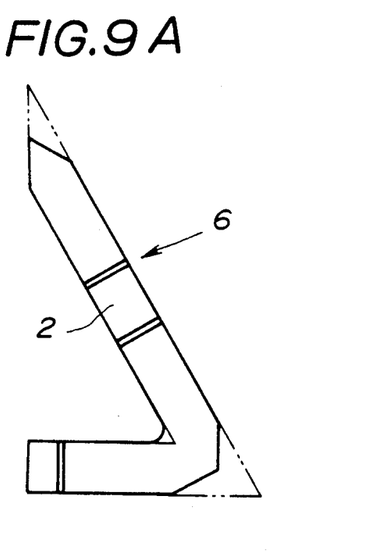

FIGS. 9A and 9B show another auxiliary brick 6. As shown in FIG. 11, such auxiliary bricks 6 are placed at corner or edge portions in a regenerator.

This invention is not limited to the above-stated embodiments. For example, a brick may be made of Mg-Cr, Cr-Mg, high alumina or chamotte materials. Although in the above embodiments the wall thickness of the bricks is 40 mm, its preferable range is 30-60 mm.

What is claimed is:

1. A refractory brick, for a heat regenerator in a glass fusion furnace, in the form of a triangular hollow-prism brick body having a uniform wall thickness throughout its length, the hollow interior of the brick body defining a single flow passage extending through the brick body, the single flow passage having a substantially regular triangular cross-section and constituting the entirety of the hollow interior, the brick body having three notches on its lower end and three projections formed on its upper end for engaging the three notches of a like brick whereby relative movement between the plural refractory bricks is avoided when plural refractory bricks are vertically stacked, said notches being significantly larger than said projections so as to leave spaces therebetween forming lateral passages in a plane perpendicular to said single flow passage when plural refractory bricks are vertically stacked, said brick body having three inner round corners and three outer angular corners, the angle of each outer angular corner being 120 degrees, each of said notches being positioned intermediate two corners.

2. The refractory brick of claim 1, wherein said notches are U-shaped.

3. The refractory brick of claim 1, wherein said projections are trapezoidal.

4. The refractory brick of claim 2, wherein said projections are trapezoidal.

* * * * *